(12) United States Patent
Pollock et al.

(10) Patent No.: US 7,478,500 B1
(45) Date of Patent: Jan. 20, 2009

(54) PYRAMIDAL TACKLE BOX APPARATUS

(76) Inventors: Steve T. Pollock, 1481 E. Pioneer Rd., Draper, UT (US) 84020; Megan Pollock, 1481 E. Pioneer Rd., Draper, UT (US) 84020

( * ) Notice: Subject to any disclaimer, the term of this patent is extended or adjusted under 35 U.S.C. 154(b) by 0 days.

(21) Appl. No.: 12/036,807

(22) Filed: Feb. 25, 2008

(51) Int. Cl.
   *A01K 97/06* (2006.01)
(52) U.S. Cl. ............... 43/54.1; 43/57.1; 206/315.11; 206/350; 206/818; D22/134
(58) Field of Classification Search ............. 43/54.1, 43/57.1; 206/315.11, 350, 818; 224/920; D22/134, 136, 149
   See application file for complete search history.

(56) References Cited

U.S. PATENT DOCUMENTS

| | | | | |
|---|---|---|---|---|
| 490,680 A | * | 1/1893 | Roberts | 428/542.8 |
| 1,586,665 A | * | 6/1926 | Folts | 206/457 |
| 1,679,710 A | * | 8/1928 | Creasey | 206/500 |
| D77,260 S | * | 12/1928 | Schleicher | D9/635 |
| 1,820,648 A | * | 8/1931 | Brucker | 43/57.1 |
| 1,868,066 A | * | 7/1932 | Keesey | 206/381 |
| 1,931,293 A | * | 10/1933 | Morck | 206/362.4 |
| D96,469 S | * | 8/1935 | Heaton | 43/57.1 |
| 2,134,927 A | * | 11/1938 | Pepplatt | 222/482 |
| 2,264,744 A | * | 12/1941 | Dunnam | 43/54.1 |
| 2,341,056 A | * | 2/1944 | Moore | 206/822 |
| 2,540,340 A | * | 2/1951 | Linblade | 43/57.1 |
| 2,633,269 A | * | 3/1953 | Hirschhorn | 206/264 |
| 2,657,497 A | * | 11/1953 | Beaver | 43/57.1 |
| 2,672,232 A | * | 3/1954 | Kessell, Jr. | 206/818 |
| D174,914 S | * | 6/1955 | McGee | 206/315.11 |
| D174,915 S | * | 6/1955 | McGee | 206/315.11 |
| 2,713,807 A | * | 7/1955 | Herbert | 43/57.1 |
| 2,717,391 A | * | 9/1955 | Bracken | 43/54.1 |
| 2,733,113 A | * | 1/1956 | Humbargar | 206/818 |
| 2,781,606 A | * | 2/1957 | Hoffhines et al. | 43/57.1 |
| 2,813,368 A | * | 11/1957 | Knowles | 43/57.1 |
| 2,823,971 A | * | 2/1958 | Hoyt | 43/54.1 |
| 2,831,289 A | * | 4/1958 | Klinghoffer | 43/57.1 |
| 2,850,063 A | * | 9/1958 | Horwitz | 206/315.91 |
| 2,935,238 A | * | 5/1960 | Koehler | 206/815 |
| 2,986,187 A | * | 5/1961 | Gazzara | 206/315.11 |
| 2,999,621 A | * | 9/1961 | Kiser | 43/57.1 |
| 3,095,133 A | * | 6/1963 | Vogt | 220/4.22 |

(Continued)

FOREIGN PATENT DOCUMENTS

EP         71274 A2  *  2/1983

(Continued)

*Primary Examiner*—Darren W Ark

(57) ABSTRACT

The pyramidal tackle box apparatus provides a square base with hinged folding triangular panels secured thereto. All side panels can be selectively opened to provide a fully flattened apparatus as desired, thereby allowing full access to any item stored within or without. All triangular panels feature a magnetic coating on panel interiors. At least two of the panels provide external magnetic coating. Any metallic object is thereby positionable and retained. Two opposing panels are coated with a textile. One textile coated panel features a plurality of horizontal pockets for item storage. The opposing textile panel features removable pockets for object retention and transport. The base panel provides upwardly extended pegs for fishing line spools, with orifices in two of the triangular panels for fishing line exit. The internal cover removably fits atop the pegs, thereby providing an interior shelf for use as desired.

20 Claims, 6 Drawing Sheets

U.S. PATENT DOCUMENTS

| | | | | |
|---|---|---|---|---|
| 3,122,452 A * | 2/1964 | Oakes | | 43/57.1 |
| 3,128,137 A * | 4/1964 | Dokter | | 206/315.11 |
| 3,141,258 A * | 7/1964 | Mayer | | 43/57.1 |
| 3,151,790 A * | 10/1964 | Mavrakis | | 43/54.1 |
| 3,154,880 A * | 11/1964 | Campbell | | 43/57.1 |
| 3,188,157 A * | 6/1965 | Rand | | 43/54.1 |
| 3,197,915 A * | 8/1965 | Staver | | 43/57.1 |
| 3,248,167 A * | 4/1966 | Friedman | | 206/350 |
| 3,286,390 A * | 11/1966 | Guice | | 43/57.1 |
| 3,337,028 A * | 8/1967 | Glavan | | 206/315.11 |
| 3,346,313 A * | 10/1967 | Fee | | 43/57.1 |
| 3,353,883 A * | 11/1967 | Cairo et al. | | 206/818 |
| 3,359,657 A * | 12/1967 | Hedberg | | 428/542.8 |
| 3,377,736 A * | 4/1968 | Woolworth | | 43/57.1 |
| 3,461,599 A * | 8/1969 | Sylvester | | 43/57.1 |
| 3,484,980 A * | 12/1969 | Wait | | 43/57.1 |
| 3,507,071 A * | 4/1970 | Bryson | | 43/57.1 |
| D218,899 S * | 10/1970 | Minchen | | D22/136 |
| D219,973 S * | 2/1971 | Sather | | 43/57.1 |
| 3,628,843 A * | 12/1971 | Wynne et al. | | 206/315.11 |
| 3,666,607 A * | 5/1972 | Weissman | | 428/542.8 |
| 3,674,190 A * | 7/1972 | Wright | | 206/315.11 |
| 3,680,750 A * | 8/1972 | Franco | | 206/818 |
| 3,747,258 A * | 7/1973 | Maciel | | 43/57.1 |
| 3,769,741 A * | 11/1973 | Hessler et al. | | 43/57.1 |
| 3,803,742 A * | 4/1974 | Foster | | 43/54.1 |
| 3,858,345 A * | 1/1975 | Ziegler | | 43/57.1 |
| 3,921,983 A * | 11/1975 | Taylor | | 206/818 |
| 4,020,584 A * | 5/1977 | Michal | | 43/57.1 |
| 4,023,304 A * | 5/1977 | Singer | | 43/54.1 |
| 4,026,063 A * | 5/1977 | Allen et al. | | 43/54.1 |
| 4,058,209 A * | 11/1977 | Schmidt | | 206/350 |
| 4,077,151 A * | 3/1978 | Johnson | | 206/315.11 |
| 4,095,690 A * | 6/1978 | Baldwin | | 206/312 |
| 4,103,773 A * | 8/1978 | Haber | | 206/315.9 |
| 4,128,170 A * | 12/1978 | Elliott | | 43/54.1 |
| 4,201,807 A * | 5/1980 | Rocca | | 206/447 |
| 4,237,097 A * | 12/1980 | McDuffie | | 206/459.5 |
| 4,240,222 A * | 12/1980 | Covington | | 43/57.1 |
| 4,290,223 A * | 9/1981 | Ostenberg et al. | | 43/54.1 |
| 4,331,335 A * | 5/1982 | Starkweather | | 206/350 |
| 4,372,073 A * | 2/1983 | Goldman | | 43/57.1 |
| 4,452,003 A * | 6/1984 | Deutsch et al. | | 43/57.1 |
| 4,480,774 A * | 11/1984 | Smith et al. | | 206/315.11 |
| 4,588,078 A * | 5/1986 | Ferrero | | 206/216 |
| 4,596,329 A * | 6/1986 | Eldridge, Jr. | | 206/818 |
| 4,691,469 A * | 9/1987 | Alsobrook et al. | | 43/54.1 |
| 4,697,379 A * | 10/1987 | McPhaul | | 43/54.1 |
| 4,784,304 A * | 11/1988 | Schweitzer | | 224/920 |
| 4,832,193 A * | 5/1989 | Kime | | 206/315.11 |
| 4,846,346 A * | 7/1989 | Kime | | 206/315.11 |
| 4,852,293 A * | 8/1989 | Levine et al. | | 43/54.1 |
| 4,884,357 A * | 12/1989 | Clifford | | 43/54.1 |
| 4,886,165 A * | 12/1989 | Annett | | 206/350 |
| 4,928,823 A * | 5/1990 | Campbell | | 206/818 |
| 4,944,402 A * | 7/1990 | Wu | | 206/581 |
| 4,999,943 A * | 3/1991 | Crabtree | | 43/54.1 |
| 5,005,697 A * | 4/1991 | Jimbo et al. | | 206/818 |
| 5,012,964 A * | 5/1991 | Falletta et al. | | 224/153 |
| 5,020,269 A * | 6/1991 | Gentry et al. | | 43/54.1 |
| 5,044,537 A * | 9/1991 | Bufalo | | 220/4.27 |
| 5,052,555 A * | 10/1991 | Harmon | | 43/57.1 |
| 5,054,669 A * | 10/1991 | Zimbardi et al. | | 43/54.1 |
| 5,071,004 A * | 12/1991 | Rivera | | 206/350 |
| 5,092,075 A * | 3/1992 | Campos | | 43/54.1 |
| 5,125,183 A * | 6/1992 | Tisdell | | 43/54.1 |
| 5,181,609 A * | 1/1993 | Spielmann et al. | | 206/818 |
| 5,327,669 A * | 7/1994 | Lannan et al. | | 206/315.11 |
| 5,410,836 A * | 5/1995 | Hardy | | 43/57.1 |
| 5,417,354 A * | 5/1995 | Jones | | 206/315.11 |
| D359,587 S * | 6/1995 | Ross | | D30/101 |
| 5,471,779 A * | 12/1995 | Downey | | 43/54.1 |
| 5,526,927 A * | 6/1996 | McLemore | | 206/818 |
| 5,538,132 A * | 7/1996 | Propp et al. | | 206/350 |
| 5,547,079 A * | 8/1996 | Pino | | 206/315.11 |
| 5,551,832 A * | 9/1996 | Kelly | | 206/315.9 |
| 5,555,671 A * | 9/1996 | Voight et al. | | 43/57.1 |
| 5,584,138 A * | 12/1996 | Newberg | | 43/57.1 |
| 5,628,396 A * | 5/1997 | Weiner | | 206/216 |
| 5,630,537 A * | 5/1997 | Sciacca | | 224/920 |
| 5,632,113 A * | 5/1997 | Raymond et al. | | 43/54.1 |
| 5,660,275 A * | 8/1997 | Hilsop et al. | | 206/315.5 |
| 5,695,058 A * | 12/1997 | Dellecker | | 206/423 |
| 5,713,468 A * | 2/1998 | Streichan | | 206/372 |
| 5,760,668 A * | 6/1998 | Testa et al. | | 206/350 |
| 5,787,635 A * | 8/1998 | Lin et al. | | 43/57.1 |
| 5,839,590 A * | 11/1998 | Weiner | | 206/577 |
| D402,321 S * | 12/1998 | Kirk | | D22/112 |
| 5,882,173 A * | 3/1999 | Ziegler | | 206/315.9 |
| 5,915,947 A * | 6/1999 | Tomlinson | | 43/54.1 |
| 5,927,492 A * | 7/1999 | Moore | | 206/349 |
| 5,941,015 A * | 8/1999 | Jenkins | | 43/54.1 |
| 5,950,352 A * | 9/1999 | Volmer | | 43/54.1 |
| 5,975,393 A * | 11/1999 | Bellamy | | 206/315.11 |
| 6,006,910 A * | 12/1999 | Dellecker | | 206/423 |
| 6,119,858 A * | 9/2000 | Davidson | | 206/315.11 |
| 6,193,062 B1 * | 2/2001 | Rysgaard et al. | | 43/54.1 |
| 6,237,767 B1 * | 5/2001 | Lee | | 206/818 |
| 6,241,091 B1 * | 6/2001 | Moore et al. | | 206/349 |
| 6,250,470 B1 * | 6/2001 | Mackenzie | | 206/315.11 |
| 6,267,277 B1 * | 7/2001 | Taylor | | 206/350 |
| 6,283,288 B1 * | 9/2001 | Rich | | 43/54.1 |
| 6,301,825 B1 * | 10/2001 | Doreian | | 43/57.1 |
| 6,435,390 B1 * | 8/2002 | Abramowicz | | 224/920 |
| 6,446,382 B1 * | 9/2002 | Cloutier et al. | | 43/54.1 |
| 6,513,344 B1 * | 2/2003 | Pollock | | 62/457.6 |
| 6,516,555 B2 * | 2/2003 | Buzzell | | 43/57.1 |
| 6,527,113 B2 * | 3/2003 | Blake | | 206/315.11 |
| 6,612,434 B1 * | 9/2003 | Redzisz | | 206/315.11 |
| 6,618,981 B1 * | 9/2003 | Rodriguez | | 43/54.1 |
| 6,694,667 B2 * | 2/2004 | Davis | | 43/54.1 |
| 6,742,982 B2 * | 6/2004 | Kelly | | 206/499 |
| 6,889,469 B1 * | 5/2005 | Chung | | 43/57.1 |
| 7,069,687 B2 * | 7/2006 | Jang | | 43/57.1 |
| 7,080,477 B2 * | 7/2006 | Shannon | | 43/54.1 |
| 7,213,364 B2 * | 5/2007 | Noraker | | 43/54.1 |
| 7,415,794 B1 * | 8/2008 | Thompson | | 43/54.1 |
| 2002/0070137 A1 * | 6/2002 | Hedges | | 206/373 |
| 2004/0074787 A1 * | 4/2004 | Donos | | 206/120 |
| 2005/0247585 A1 * | 11/2005 | Breckwoldt et al. | | 206/350 |
| 2005/0247588 A1 * | 11/2005 | Hedges | | 206/373 |
| 2006/0065558 A1 * | 3/2006 | Chang | | 206/818 |
| 2006/0162234 A1 * | 7/2006 | Gagnet | | 43/57.1 |
| 2006/0231430 A1 * | 10/2006 | Seabra | | 206/818 |
| 2007/0017147 A1 * | 1/2007 | Manzo | | 43/57.1 |
| 2007/0023304 A1 * | 2/2007 | Joyce et al. | | 206/350 |
| 2007/0119492 A1 * | 5/2007 | Zheng | | 220/9.2 |
| 2007/0193902 A1 * | 8/2007 | Myers et al. | | 206/818 |
| 2007/0220801 A1 * | 9/2007 | Clawson | | 43/54.1 |

FOREIGN PATENT DOCUMENTS

| | | | |
|---|---|---|---|
| FR | 2702928 A3 * | 9/1994 | |
| JP | 07203819 A * | 8/1995 | |
| JP | 07213209 A * | 8/1995 | |
| JP | 08089149 A * | 4/1996 | |
| JP | 08163945 A * | 6/1996 | |
| JP | 08228654 A * | 9/1996 | |
| JP | 09023798 A * | 1/1997 | |
| JP | 09065810 A * | 3/1997 | |
| JP | 10140408 A * | 5/1998 | |
| JP | 10150896 A * | 6/1998 | |
| JP | 10257843 A * | 9/1998 | |
| JP | 11169044 A * | 6/1999 | |

| | | | | | | | | |
|---|---|---|---|---|---|---|---|---|
| JP | 11289943 | A | * | 10/1999 | JP | 2004105077 A | * | 4/2004 |
| JP | 2000004743 | A | * | 1/2000 | JP | 2005040040 A | * | 2/2005 |
| JP | 2000032892 | A | * | 2/2000 | JP | 2005046007 A | * | 2/2005 |
| JP | 2001069893 | A | * | 3/2001 | JP | 2005261249 A | * | 9/2005 |
| JP | 2001333680 | A | * | 12/2001 | JP | 2005333811 A | * | 12/2005 |
| JP | 2002218885 | A | * | 8/2002 | JP | 2006180858 A | * | 7/2006 |
| JP | 2002281878 | A | * | 10/2002 | JP | 2007029000 A | * | 2/2007 |
| JP | 2003088285 | A | * | 3/2003 | WO | WO 8605666 A1 | * | 10/1986 |
| JP | 2003289777 | A | * | 10/2003 | WO | WO 9905907 A1 | * | 2/1999 |
| JP | 2003289778 | A | * | 10/2003 | | | | |
| JP | 2003299431 | A | * | 10/2003 | | | | |

* cited by examiner

PYRAMIDAL TACKLE BOX APPARATUS

BACKGROUND OF THE INVENTION

Tackle boxes are typically considered a necessity for fishermen. Fishing line, weights, tackle, pliers, knives, and a host of other items are typically contained within. Most tackle boxes are comprised of a hinged lid with a plurality of trays within the box, sometimes in multiple tiers. Most fishermen are faced with the fact that keeping hooks, lures, and other items effectively separated is impossible. Fishing line gets tangled. Lures catch on each other. Hooks and treble hooks can become very difficult to separate, especially without hooking oneself. Further, accessibility is hampered by typical box designs, with multiple hinged trays, lift out trays, and the plurality of fishing tackles contained therein, all further contributing to the above listed problems and more. The present apparatus provides a uniquely designed solution to these problems in a lightweight, easily transported package.

FIELD OF THE INVENTION

The present apparatus relates to fishing tackle box and tool carriers and more especially to a pyramidal tackle box apparatus with hinged folding triangular side panels secured to a square base.

SUMMARY OF THE INVENTION

The general purpose of the pyramidal tackle box apparatus, described subsequently in greater detail, is to provide a pyramidal tackle box apparatus which has many novel features that result in an improved pyramidal tackle box apparatus which is not anticipated, rendered obvious, suggested, or even implied by prior art, either alone or in combination thereof.

To attain this, the pyramidal tackle box apparatus provides a square base with hinged folding triangular panels secured thereto. All side panels can be opened to provide a fully flattened apparatus as desired. The apparatus can be positioned to allow full access to any item stored within or without. All triangular panels feature a magnetic coating on panel interiors. At least two of the panels, depending upon the embodiment, provide external magnetic coating. Any metallic object is thereby positionable and retained. Two opposing panels are, depending upon the embodiment, coated with a textile. One textile coated panel features a plurality of horizontal pockets for item storage. The opposing textile panel features removable pockets for object retention and transport.

The base panel provides upwardly extended pegs for fishing line spools, with orifices in two of the triangular panels for fishing line exit. The internal cover removably fits atop the pegs, thereby providing an interior shelf for use as desired.

Thus has been broadly outlined the more important features of the improved pyramidal tackle box apparatus so that the detailed description thereof that follows may be better understood and in order that the present contribution to the art may be better appreciated.

An object of the pyramidal tackle box apparatus is to be portable.

Another object of the pyramidal tackle box apparatus is to be lightweight.

A further object of the pyramidal tackle box apparatus is to provide magnetic surfaces for holding fishing tackle.

An added object of the pyramidal tackle box apparatus is to be capable of fully opening to allow full access to tackle.

And, an object of the pyramidal tackle box apparatus is to permanent storage pockets.

Still another object of the pyramidal tackle box apparatus is to provide removable storage pockets.

These together with additional objects, features and advantages of the improved pyramidal tackle box apparatus will be readily apparent to those of ordinary skill in the art upon reading the following detailed description of presently preferred, but nonetheless illustrative, embodiments of the improved pyramidal tackle box apparatus when taken in conjunction with the accompanying drawings.

In this respect, before explaining the current embodiments of the improved pyramidal tackle box apparatus in detail, it is to be understood that the pyramidal tackle box apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved pyramidal tackle box apparatus. It is therefore important that the claims be regarded as including such equivalent constructions insofar as they do not depart from the spirit and scope of the pyramidal tackle box apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the pyramidal tackle box apparatus generally designated by the reference number 10 will be described.

Figure 1:
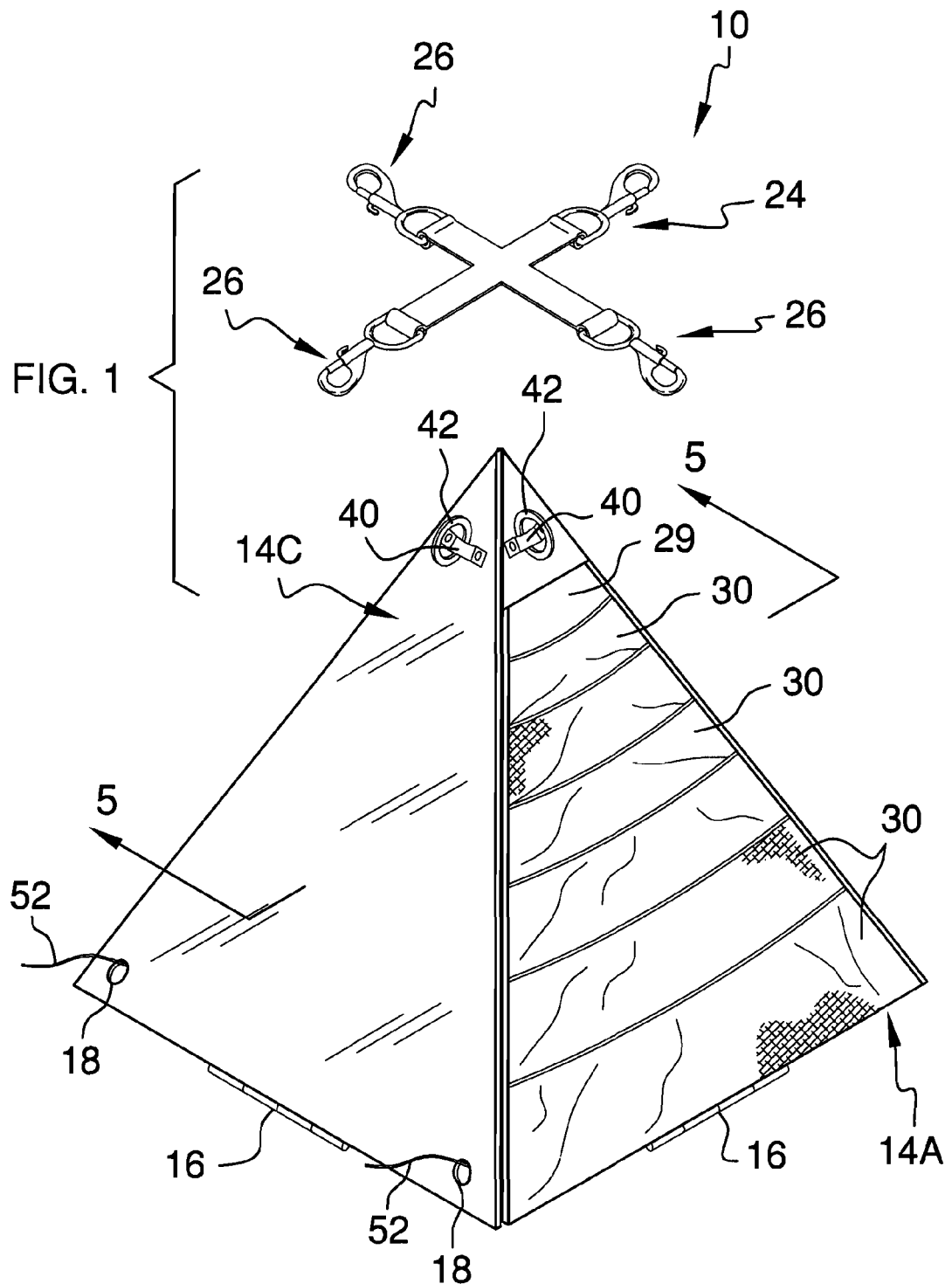
FIG. 1 is a perspective view, x-strap unhooked and side panel with horizontal pockets in view.
Figure 3:
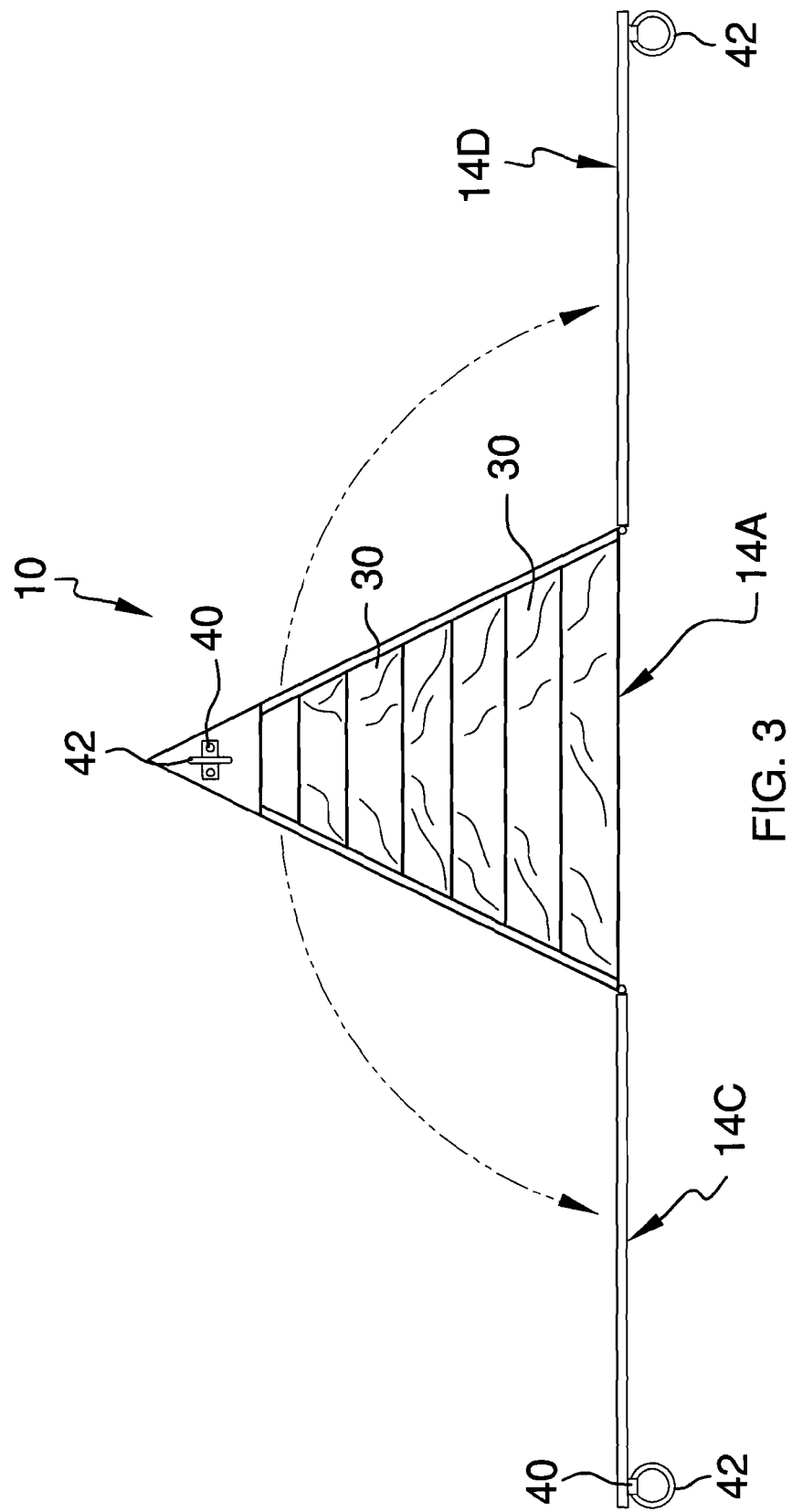
FIG. 3 is side elevation view, illustrating fold out capability of triangular panels.
Figure 4:
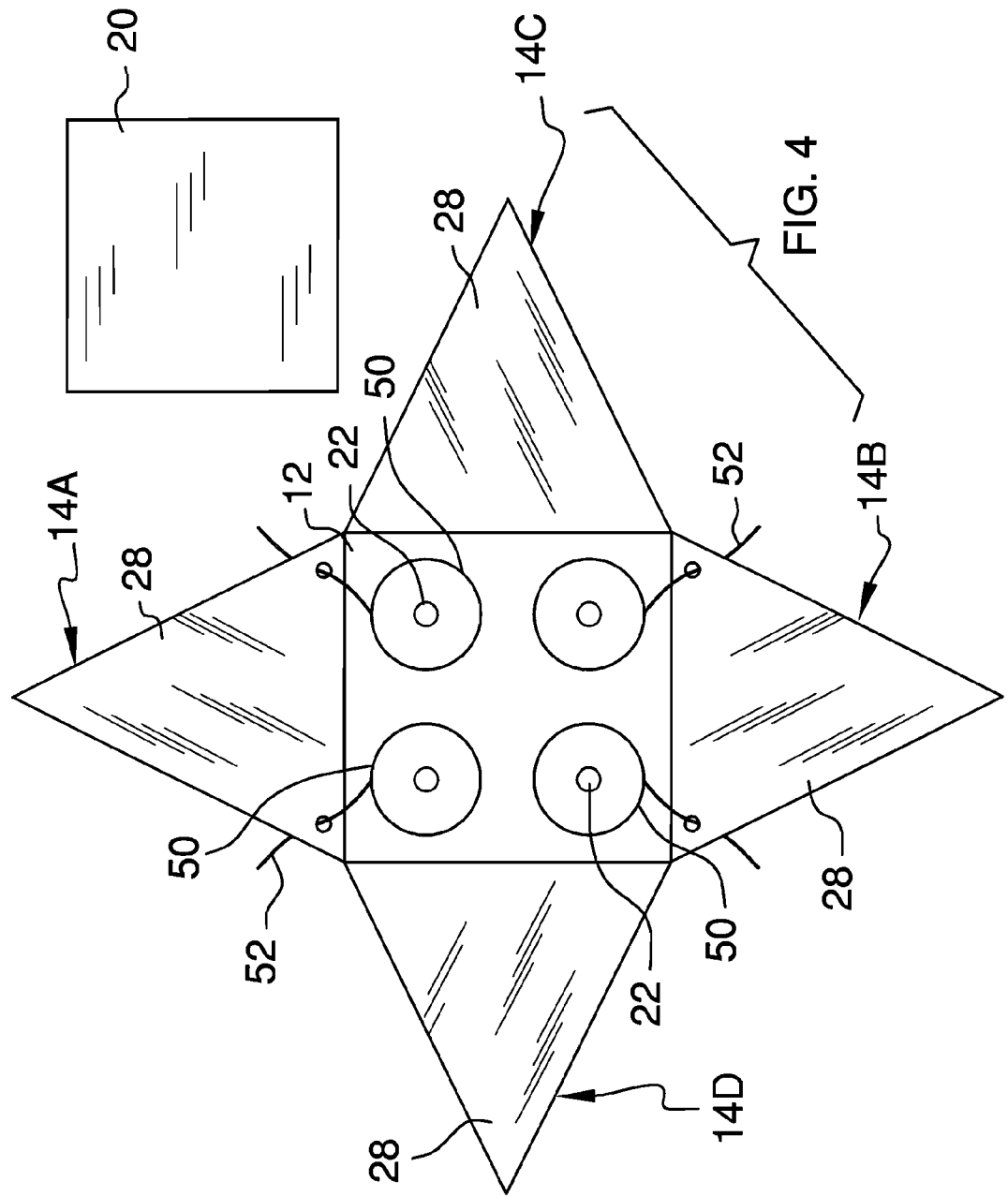
FIG. 4 is a top plan view, with triangular panels hinged outwardly and fishing line spools on the pegs of the bottom panel.
Figure 5:
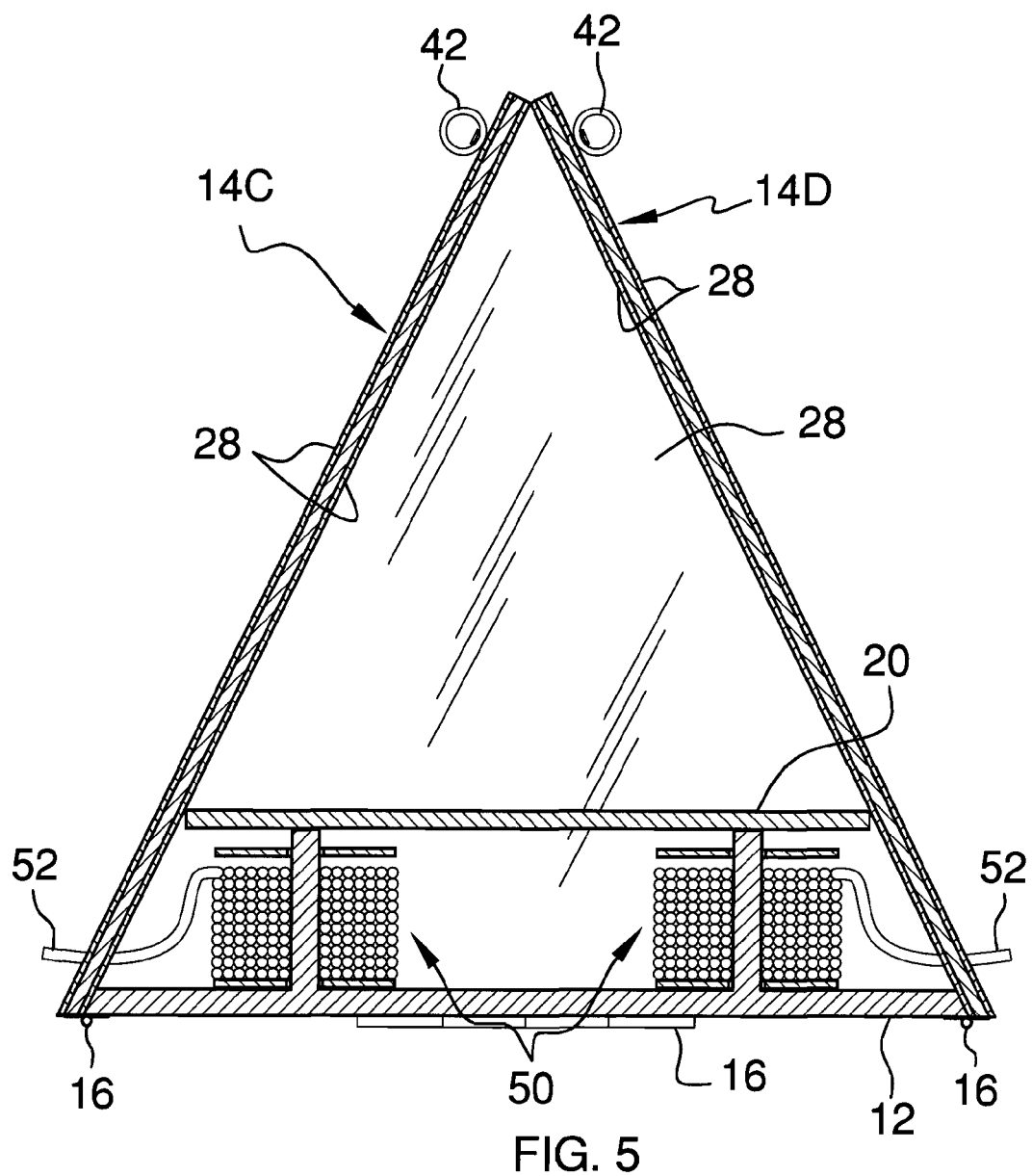
FIG. 5 is a cross sectional view of FIG. 1.
Figure 6:
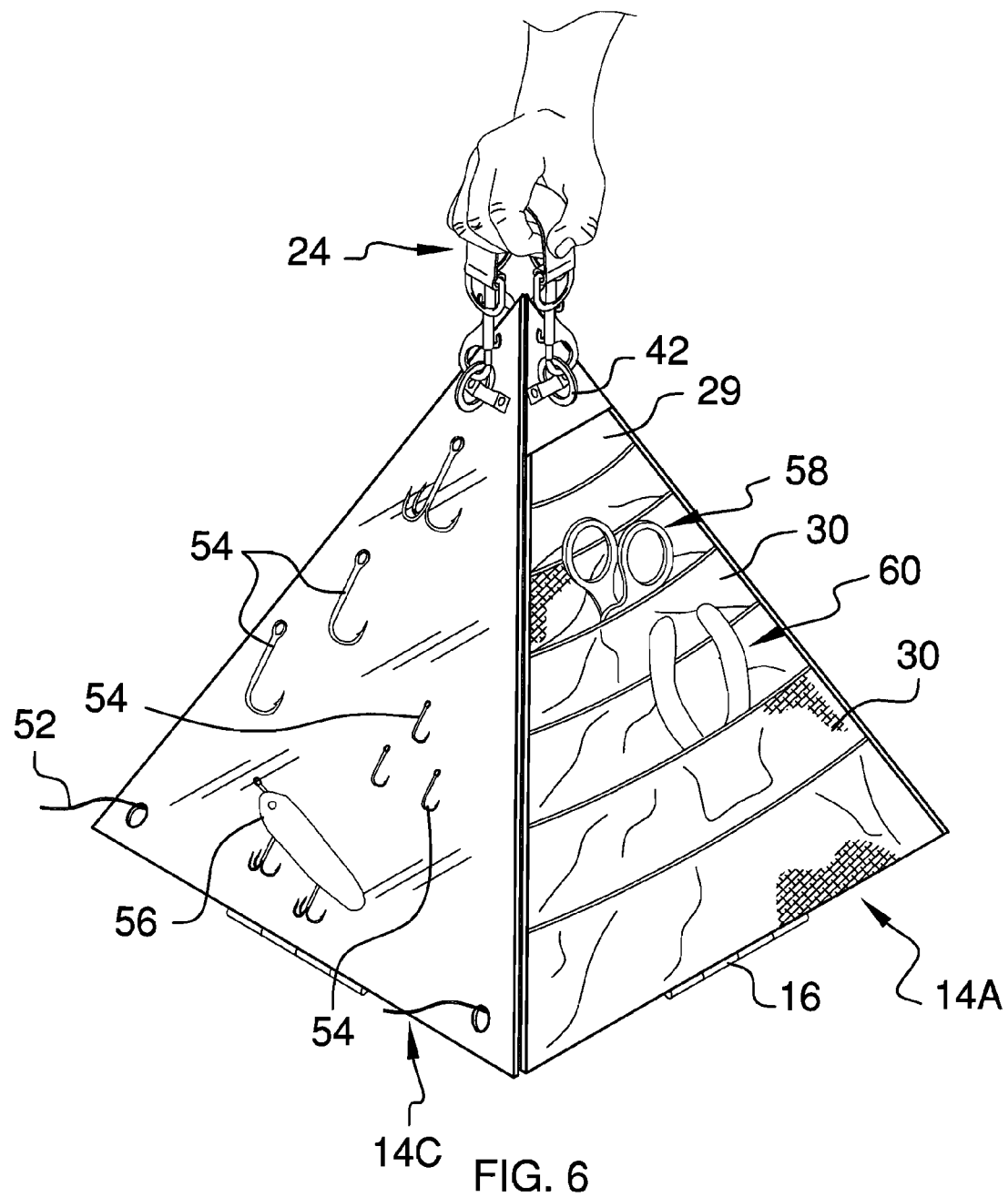
FIG. 6 is a perspective view of the apparatus in use.

Referring to FIGS. 1 and 3, the pyramidal tackle box apparatus 10 provides a tackle box with hinged triangular panels 14 which fold in to form the pyramid and outwardly to provide a fully collapsed, open arrangement. The four triangular panels 14 are comprised of a first panel 14A, an opposite second panel 14B, a third panel 14C, and a fourth panel 14D. Each triangular panel 14 has a base hingedly attached to a one of each side of the base panel 12.

Figure 2:
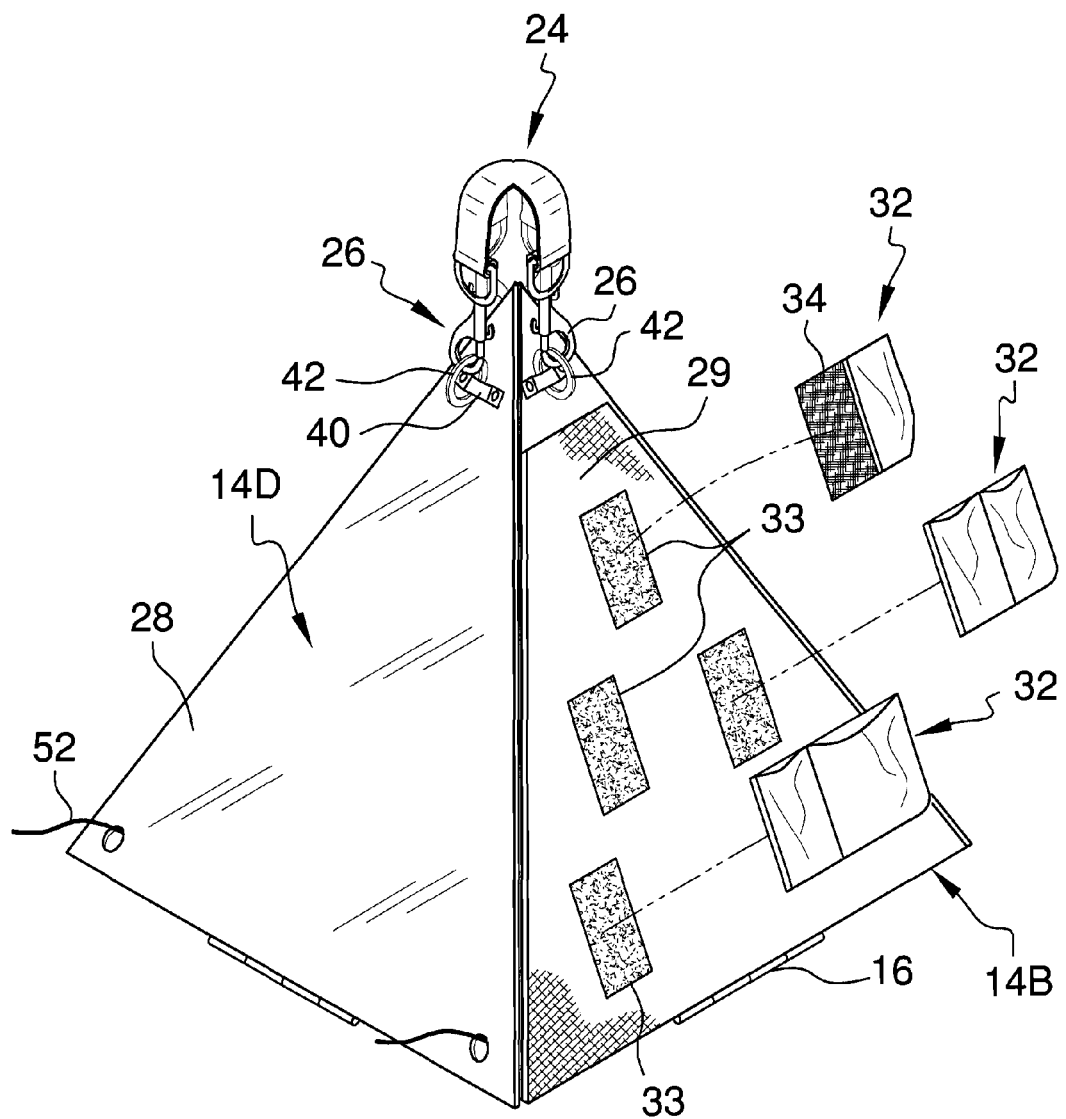
FIG. 2 is a perspective view, x-strap hooked to the rings, and side panel with removable pockets in view.

Referring to FIGS. 2, 4, 5, and 6 and further to FIGS. 1 and 2, the magnetic coating 28 is disposed on the interior of each triangular panel 14. Magnetic coating 28 is also disposed on the exterior of each of the third panel 14C and fourth panels 14D. The magnetic coating 28 provides for positioning and holding any metallically attracted object, such as hooks 54, lures 56 or other. The ability to position and retain the position of such items, both on the inside and outside of the apparatus 10 provides a heretofore unavailable convenience. Tangling of items is prevented, and visible and tactile availability is pronounced. A pair of spaced apart orifices 18 is disposed proximal to the base of the third panel 14C and fourth panel 14D. A textile covering 29 is affixed on the exterior of each of the first panel 14A and second panel 14B. The plurality of horizontal pockets 30 is disposed on the textile covering 29 of the first triangular panel 14A. The horizontal pockets 30 provide for carrying items such as scissors 58, pliers 60, or any other item chosen. The plurality of hook and loop sections 33 is affixed to the textile covering 29 of the second panel 14B. The plurality of removable pockets 32 is provided for holding items as desired. Each removable pocket 32 further comprises one side having hook and loop 34 for removably affixing to the hook and loop sections 33. The plurality of spaced apart pegs 22 is extended vertically upward from the base panel 12. Fishing line spools 50 are removably placed upon the pegs 22 as desired. The orifices 18 in the third panel 14C and fourth panel 14D provide for fishing line 52 to exit the apparatus 10 conveniently for a fisherman's needs. The cover 20 removably rests atop the pegs 22. The cover 20 provides more than one function. First, the cover 20 retains any fishing line spools 50 removably placed upon the pegs 22. And, the cover 20 prevents other fishing gear from residing or falling into the peg 22 area. Also, the cover 20 provides a shelf for holding any items desired, food, drinks, even a smaller tackle box, hook boxes, or any appropriate gear or tools. The means for carrying the apparatus 10 partially comprises a ring 42 affixed to the top of each triangular panel 14 via a securement 40. The securement 40 is flexible such that each ring 42 can also lay down against a triangular panel 14. The x-strap 24 has a plurality of hooks 26. Each hook 26 provides for removable attachment to each ring 42, respectively.

The flexible removable x-strap 24 thereby becomes a handle for carrying the apparatus 10. The x-strap also retains the triangular panels 14 in a position of closed assembly for the apparatus 10.

With respect to the above description then, it is to be realized that the optimum dimensional relationships for the parts of the pyramidal tackle box apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the pyramidal tackle box apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the pyramidal tackle box apparatus may be used.

Therefore, the foregoing is considered as illustrative only of the principles of the pyramidal tackle box apparatus. Further, since numerous modifications and changes will readily occur to those skilled in the art, it is not desired to limit the pyramidal tackle box apparatus to the exact construction and operation shown and described, and accordingly, all suitable modifications and equivalents may be resorted to, falling within the scope of the pyramidal tackle box apparatus.

What is claimed is:

1. A pyramidal tackle box apparatus, comprising:
a square base panel with four sides;
four triangular panels comprised of a first panel, a second panel opposite said first panel, a third panel, and a fourth panel, each triangular panel having a base hingedly attached to a respective one of the four sides of the base panel;
whereby the base and triangular panels selectively form a pyramid or an openly arranged structure;
a magnetic coating on an interior of each triangular panel;
a textile covering on an exterior of the first triangular panel;
a plurality of horizontal pockets on the textile covering; and
means for carrying the apparatus.

2. The apparatus according to claim 1 wherein the means for carrying the apparatus further comprises an attachment affixed to a top of each triangular panel.

3. The apparatus according to claim 2 wherein the attachment affixed to the top of each triangular panel is further removable.

4. The apparatus according to claim 3 wherein the means for carrying the apparatus further comprises a ring affixed to the top of each triangular panel and;
a flexible x-strap having a plurality of hooks, each hook for removable attachment to each ring, respectively.

5. The apparatus according to claim 4 further comprising a magnetic coating on an exterior of each of the second, third, and fourth triangular panels.

6. The apparatus according to claim 2 further comprising a magnetic coating on an exterior of each of the second, third, and fourth triangular panels.

7. The apparatus according to claim 3 further comprising a magnetic coating on an exterior of each of the second, third, and fourth triangular panels.

8. The apparatus according to claim 1 further comprising a magnetic coating on an exterior of each of the second, third, and fourth triangular panels.

9. A pyramidal tackle box apparatus, comprising:
a square base panel with four sides;
four triangular panels comprises of a first panel, a second panel opposite said first panel, a third panel, and a fourth panel, each triangular panel having a base hingedly attached to a respective one of the four sides of the base panel;
whereby the base and triangular panels selectively form a pyramid or an openly arranged structure;
a magnetic coating on an interior of each triangular panel;
a magnetic coating on an exterior of the third and fourth triangular panels;
a textile covering on an exterior of each of the first and second triangular panels;
a plurality of horizontal pockets on the textile covering of the first triangular panel;
a plurality of hook and loop sections affixed to the textile covering of the second triangular panel;
a plurality of removable pockets, each removable pocket further comprising one side having hook and loop for removably affixing to the hook and loop sections; and
means for carrying the apparatus.

10. The apparatus according to claim 9 wherein the means for carrying the apparatus further comprises an attachment affixed to a top of each triangular panel.

11. The apparatus according to claim 10 wherein the attachment affixed to the top of each triangular panel is further removable.

12. The apparatus according to claim 11 wherein the means for carrying the apparatus further comprises a ring affixed to the top of each triangular panel and;
a flexible x-strap having a plurality of hooks, each hook for removable attachment to each ring, respectively.

13. The apparatus according to claim 12 further comprising a magnetic coating on an exterior of each of the third and fourth triangular panels.

14. The apparatus according to claim 10 further comprising a magnetic coating on an exterior of each of the third and fourth triangular panels.

15. The apparatus according to claim 11 further comprising a magnetic coating on an exterior of each of the third and fourth triangular panels.

16. The apparatus according to claim 9 further comprising a magnetic coating on an exterior of each of the third and fourth triangular panels.

17. A pyramidal tackle box apparatus, comprising:
- a square base panel with four sides;
- four triangular panels comprised of a first panel, a second panel opposite said first panel, a third panel, and a fourth panel, each triangular panel having a base hingedly attached to a respective one of the four sides of the base panel;
- whereby the base and triangular panels selectively form a pyramid or an openly arranged structure;
- a magnetic coating on an interior of each triangular panel;
- a magnetic coating on an exterior of each of the third and fourth triangular panels;
- a pair of spaced apart orifice proximal to the base of the third and fourth triangular panels;
- a textile covering on an exterior of each of the first and second triangular panels;
- a plurality of horizontal pockets disposed on the textile covering of the first triangular panel;
- a plurality of hook and loop sections affixed to the textile covering of the second panel;
- a plurality of removable pockets, each removable pocket further comprising one side having hook and loop for removably affixing to the hook and loop sections;
- a plurality of spaced apart pegs extended vertically upward from the base panel;
- a cover for removably resting atop the pegs; and
- means for carrying the apparatus.

18. The apparatus according to claim 17 wherein the means for carrying the apparatus further comprises an attachment affixed to a top of each triangular panel.

19. The apparatus according to claim 18 wherein the attachment affixed to the top of each triangular panel is further removable.

20. The apparatus according to claim 19 wherein the means for carrying the apparatus further comprises a ring affixed to the top of each triangular panel and;
- a flexible x-strap having a plurality of hooks, each hook for removable attachment to each ring, respectively.

* * * * *